(12) United States Patent
Saito et al.

(10) Patent No.: US 7,767,354 B2
(45) Date of Patent: Aug. 3, 2010

(54) TEMPERATURE CONTROLLING APPARATUS FOR BATTERY, VEHICLE APPARATUS USING THE SAME, AND CONTROLLING METHOD THEREFOR

(75) Inventors: Mitsunobu Saito, Shioya-gun (JP);
Morio Kayano, Utsunomiya (JP);
Tomohiko Maeda, Utsunomiya (JP);
Hiroshi Murakami, Saitama (JP);
Kazushi Ota, Utsunomiya (JP)

(73) Assignees: Honda Giken Kogyo Kabushiki Kaisha, Tokyo (JP); Keihin Corporation, Tokyo (JP)

( * ) Notice: Subject to any disclaimer, the term of this patent is extended or adjusted under 35 U.S.C. 154(b) by 306 days.

(21) Appl. No.: 10/315,080

(22) Filed: Dec. 10, 2002

(65) Prior Publication Data
US 2003/0118891 A1    Jun. 26, 2003

(30) Foreign Application Priority Data
Dec. 12, 2001 (JP) ............................... 2001-379063

(51) Int. Cl.
*H01M 18/04* (2006.01)
(52) U.S. Cl. .................... 429/433; 429/430; 429/431
(58) Field of Classification Search .................. None
See application file for complete search history.

(56) References Cited

U.S. PATENT DOCUMENTS 6,444,350 B1 * 9/2002 Toya et al. .................. 429/90

FOREIGN PATENT DOCUMENTS

| JP | 9-92347 | 4/1997 |
|---|---|---|
| JP | 10-341505 | 12/1998 |
| JP | 2000-36327 | 2/2000 |

OTHER PUBLICATIONS

Office Action issued on Jul. 3, 2007, on the counterpart Japanese Patent Application No. 2001-379063, with English translation.

* cited by examiner

*Primary Examiner*—Patrick Ryan
*Assistant Examiner*—Cynthia Lee
(74) *Attorney, Agent, or Firm*—Westerman, Hattori, Daniels & Adrian, LLP

(57) ABSTRACT

In an ECU, a coolant fan performs cooling operation such that a control DUTY value is limited by a control DUTY value according to tolerable noise level of the cooling fan based on a vehicle speed in a case in which the temperature in the high-voltage battery is lower than a predetermined limitation for highest temperature. In a case in which the temperature in the high-voltage battery is higher than the predetermined limitation for highest temperature, the cooling fan performs the cooling operation by using an energy storage device cooling operation requirement value and an IPU cooling operation requirement value such that performance in the high-voltage battery is not affected. By doing this, a temperature controlling apparatus for batteries in which it is possible to cool the battery and solve temperature difference among a plurality of batteries can be provided.

2 Claims, 8 Drawing Sheets

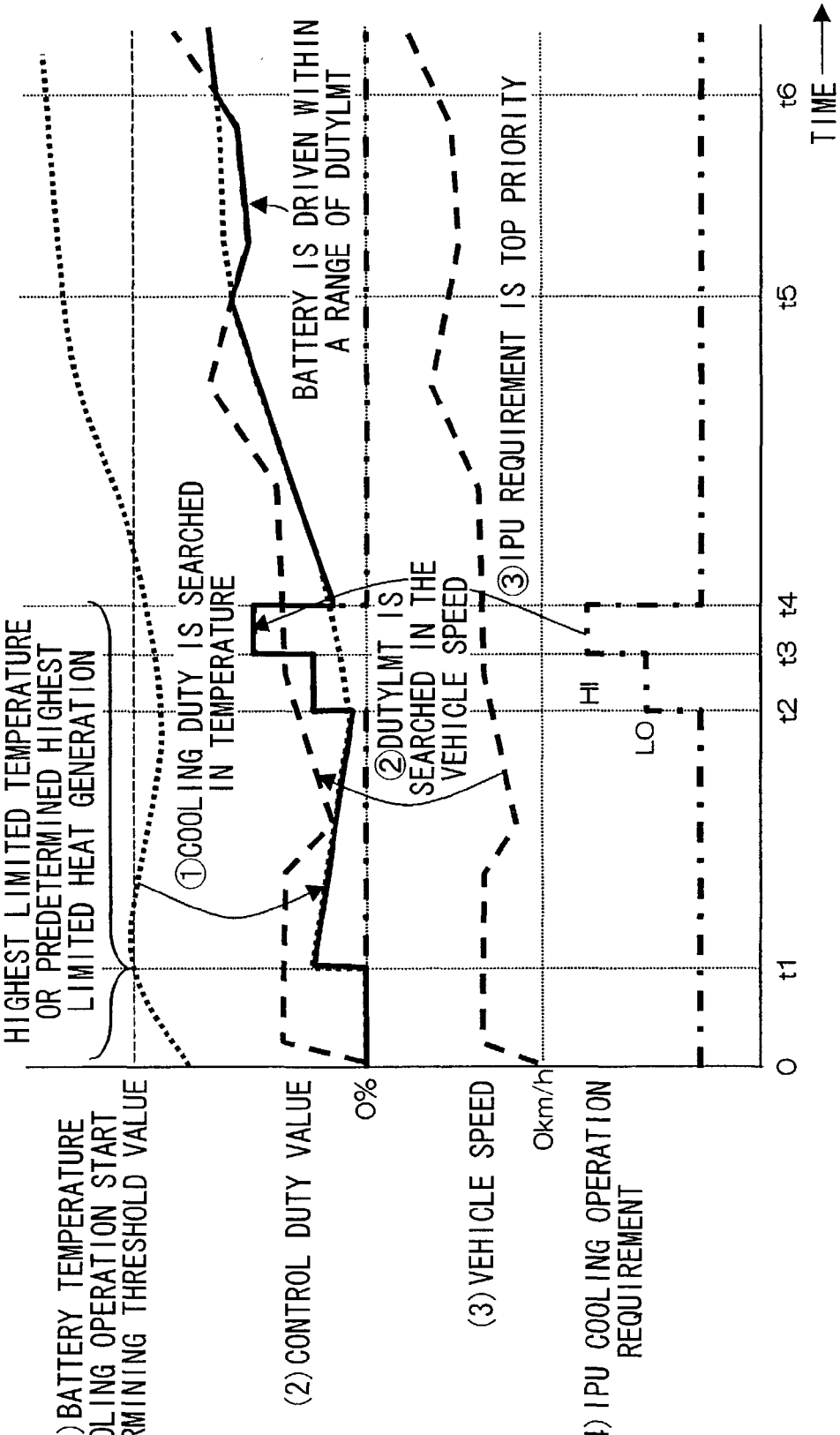

TEMPERATURE CONTROLLING APPARATUS FOR BATTERY, VEHICLE APPARATUS USING THE SAME, AND CONTROLLING METHOD THEREFOR

BACKGROUND OF THE INVENTION

1. Field of the Invention

The present invention relates to a temperature controlling apparatus for batteries for cooling a power supplying device which is carried on a vehicle. Also, the present invention relates to a vehicle apparatus using the same.

2. Description of Related Art

Ordinarily, driving force of electric energy for vehicles such as an Electric Vehicles (hereinafter called EVs) and Hybrid Electric Vehicles (hereinafter called HEVs) can be obtained by generating a three-phase alternating current (hereinafter called 3-phase AC) by inverting the current sent from a high-voltage battery by an inverter so as to rotate a 3-phase AC motor. Also, in contrast, the vehicle uses the energy efficiently by storing the energy which is regenerated by regenerating operation of the 3-phase AC motor in the battery when the vehicle is decelerated.

However, such high-voltage batteries which are used in the EVs and the HEVs use a plurality of battery module which are connected. In the battery module, a plurality of nickel-hydrogen batteries are connected in series. Therefore, there is a problem in that battery temperatures differ, and because of this, current-charging function and current-discharging function decrease in the battery. In particular, in cold area, when a vehicle is used under low temperature conditions, temperature differences between a battery module which is disposed on a cabin floor of the vehicle and a battery module which is disposed on an opposite surface of the cabin floor tends to increase.

In order to solve the above-mentioned problem, conventionally, there has been proposed a temperature controlling apparatus for a battery which is disclosed in Japanese Unexamined Patent Application, First Publication No. Hei 9-92347. In this apparatus, a cooling fan is controlled according to temperature and heat is generated in a battery.

However, an object of a conventional temperature controlling apparatus for a battery was to cool the entire battery. Thus, a cooling fan was controlled by monitoring heat generated in the battery, although, it was not considered to control the temperature among a plurality of batteries uniformly.

SUMMARY OF THE INVENTION

The present invention was made in consideration of the problem explained above. An object of the present invention is to provide a temperature controlling apparatus for a battery which can cool the battery and control the temperature among a plurality of batteries uniformly.

In order to solve the problem explained above, in a first aspect of the present invention, a temperature controlling apparatus for battery, which is provided with a cooling fan (for example, a cooling fan 18 in embodiments) for sending cooling air to a plurality of batteries which are connected to each other, comprises a temperature measuring device (for example, temperature sensors 21a, 21b, and 21c in the embodiments) for measuring the temperature in each battery, a temperature difference calculating device (for example, a step S7 in the embodiments) for calculating temperature differences among batteries, a controlling device (for example, steps S8 to S10 in the embodiments) for setting and controlling current value sent to the cooling fan according to the temperature difference among batteries. In the temperature controlling apparatus for a battery having structure explained above, it is possible to set the current which is sent to the cooling fan according to temperature difference among a plurality of batteries which are connected to each other.

In a second aspect of the present invention, a temperature controlling apparatus for batteries (for example, high-voltage battery 1 in the embodiments), which is provided with a cooling fan (for example, a cooling fan 18 in the embodiments) for sending cooling air to a plurality of batteries which are connected to each other, comprises a temperature measuring device (for example, temperature sensors 21a, 21b, and 21c in the embodiments) for measuring the temperature of each battery, a temperature difference calculating device (for example, a step S7 in the embodiments) for calculating temperatures difference among batteries, a first setting device (for example, steps S1 to S6 in the embodiments) for setting and controlling a first current value sent to the cooling fan according to the temperature difference among batteries, a second setting device (for example, a step S8) for setting and controlling a second current value sent to the cooling fan according to the temperature difference among batteries, and a comparison controlling device (for example, steps S9 to S10 in the embodiments) which chooses the larger current value between the first current value and the second current value so as to control the cooling fan. In the temperature controlling apparatus for a battery having a structure explained above, it is possible to set the current which is sent to the cooling fan according to conditions such as temperature difference among the batteries and temperature of each battery among a plurality of batteries which are connected to each other so as to control the cooling air.

In a third aspect of the present invention, in a temperature controlling apparatus for batteries, an current measuring device (for example, an current sensor 28 in the embodiments) for measuring current which is charged to or discharged from the batteries is provided, and the first setting device sets the first current value according to the temperature of the batteries and the current which is measured by the controlling device. In the temperature controlling apparatus for batteries having the structure explained above, it is possible to set the current which is sent to the cooling fan by determining the condition of each battery according to conditions such as temperature differences among the batteries and temperature of each battery.

In a fourth aspect of the present invention, a vehicle apparatus, having a motor (for example, a 3-phase AC motor 4 in the embodiments) for driving a vehicle or supporting an output from the vehicle's engine (for example, an engine 5 in the embodiments) and a plurality of batteries (for example, a high-voltage battery 1 in the embodiments) which are connected to each other for storing energy which is generated by the motor and energy which is regenerated by regenerating operation of the motor when the vehicle is decelerated and a cooling fan (for example, a cooling fan 18 in the embodiments) which sends cooling air to the batteries, comprises a temperature measuring device (for example, temperature sensors 21a, 21b, and 21c in the embodiments) for measuring the temperature of each battery, a temperature difference calculating device (for example, a step S7 in the embodiments) for calculating temperature difference among batteries, a controlling device (for example, steps S8 to S10 in the embodiments) for setting and controlling current value sent to the cooling fan according to the temperature difference among batteries, a speed measuring device (for example, a vehicle speed sensor in the embodiments) for measuring driving speed of the vehicle; and an current limiting device (for example, steps S35, and S41 to S46 in the embodiments) for limiting the current according to the driving speed of the vehicle.

In the vehicle apparatus having structure explained above, it is possible to set the current which is sent to the cooling fan according to the temperature difference among a plurality of batteries which are connected to each other and change the current which is sent to the cooing fan according to the vehicle speed so as to control the cooling air.

In a fifth aspect of the present invention, a vehicle apparatus is provided with a limitation clearing device (for example, steps S43 and S 46 in the embodiments) for canceling the limitation for the current made by the current limiting device under conditions that the temperature of the batteries rises higher than a predetermined limitation for highest temperature.

In the vehicle apparatus having a structure as explained above, it is possible to send a cooling air to the battery regardless of the vehicle speed because the limitation for the current which is sent to the cooling fan is cleared when the temperature of the battery rises higher than the predetermined limitation for the highest temperature.

In a sixth aspect of the present invention, a vehicle apparatus is provided with a limitation canceling device (for example, steps S34, S42, and S46 in the embodiments) which cancels the limitation made by the current limiting device when information for the driving speed of the vehicle cannot be obtained from the speed measuring device for a predetermined period of time under conditions in which electricity is charged to or discharged from the batteries.

In the vehicle apparatus having the structure explained above, it is possible to send a cooling air to the battery regardless of the vehicle speed because the limitation for the current which is sent to the cooling fan is cleared when information for the driving speed of the vehicle cannot be obtained from the speed measuring device for a predetermined period of time.

Furthermore, in addition to the vehicle apparatus explained above, the present invention can provide a vehicle having the following structure.

That is, in a vehicle apparatus according to the present invention having an inverter device (for example, an inverter 3 for driving a motor in the embodiments) for controlling a motor (for example, a 3-phase AC motor 4 in the embodiments) for driving a vehicle or supporting an output from an engine (for example, an engine 5 in the embodiments), batteries (for example, high-voltage battery 1 in the embodiments) which are disposed in a plurality of arrays for storing energy which is generated by the motor and energy which is regenerated by regenerating operation of the motor when the vehicle is decelerated, a cooling fan (for example, a cooling fan 18 in the embodiments) for introducing an air to both the batteries and the inverter device, the vehicle apparatus according to the present invention comprises temperature measuring devices (for example, temperature sensors 21a, 21b, and 21c) for measuring the temperature of each battery, a first current setting device (for example, steps S1 to S6 in the embodiments) for setting the first current which is sent to the cooling fan according to the temperature of the batteries, a temperature difference calculating device (for example, a step S7 in the embodiments) for calculating difference of temperature among batteries, a second current setting device (for example, step S8 in the embodiments) for setting the second current which is sent to the cooling fan according to the difference in the temperatures among the batteries, a first selecting device (for example, steps S9 and S10 in the embodiments) for comparing the first current and the second current so as to select a larger current, a speed measuring device (for example, a vehicle speed sensor in the embodiments) for measuring a driving speed of the vehicle, a third current setting device (for example, a step S41 in the embodiments) for setting the third current which is sent to the cooling fan according to the driving speed of the vehicle, a second selecting device (for example, step S44 in the embodiments) for comparing the current which is selected by the first selecting device and the third current so as to select the smaller current, an inverter temperature measuring device (for example, a temperature sensor 23 in the embodiments) for measuring temperature of components in the inverter device, a fourth current setting device (for example, a step S32 in the embodiments) for setting the fourth current which is sent to the cooling fan according to the temperature of the components in the inverter device, and a controlling device (for example, a step S58 in the embodiments) for selecting a larger current between the current which is selected by the second selecting device and the fourth current so as to control the cooling fan.

In the vehicle apparatus which is provided with the above-explained structures, the current which is sent to the cooling fan is controlled under conditions that the temperature differences among the batteries takes priority over the temperature of each battery. Also, the current which is sent to the cooling fan is controlled under conditions in which the vehicle speed takes priority over the temperature difference among batteries. Furthermore, the vehicle apparatus controls the current which is sent to the cooling fan under conditions in which the temperature of the components in the inverter device is the top priority among the above-explained conditions.

Also, in the vehicle apparatus according to the present invention, an current measuring device (for example, an current sensor 28 in the embodiments) for measuring current which is charged to or discharged from the batteries is provided, and the first setting device sets the first current value according to the temperature of the batteries and the current which is measured by the controlling device.

In the vehicle apparatus having the above-explained structure, it is possible to determine the condition of the batteries from view points of the temperature of the batteries and the heat generated therein so as to set the current which is sent to the cooling fan.

In a seventh aspect according to the present invention, a controlling method for the temperature controlling apparatus for battery, which is provided with a cooling fan for sending cooling air to a plurality of battery which are connected to each other, comprises steps of a temperature measuring step for measuring temperature in each battery, a temperature difference calculating step for calculating temperature difference among batteries, a controlling step for setting and controlling current value sent to the cooling fan according to the temperature difference among batteries.

By doing this, it is possible to realize the same effects as those in the first aspect of the present invention.

In an eighth aspect according to the present invention, a controlling method for the temperature controlling apparatus for battery, which is provided with a cooling fan for sending cooling air to a plurality of battery which are connected to each other, comprises steps of a temperature measuring step for measuring temperature in each battery, a temperature difference calculating step for calculating temperature difference among batteries, a first setting step for setting and controlling a first current value sent to the cooling fan according to the temperature difference among batteries, a second setting step for setting and controlling a second current value sent to the cooling fan according to the temperature difference among batteries, and a comparison controlling step which chooses larger current value between the first current value and the second current value so as to control the cooling fan.

By doing this, it is possible to realize the same effect as that in the second aspect of the present invention.

In a ninth aspect according to the present invention, in a controlling method for the temperature controlling apparatus for battery, an current measuring step for measuring current which is charged to or discharged from the batteries is provided, and the first setting step sets the first current value according to the temperature of the batteries and the current which is measured in the controlling step.

By doing this, it is possible to realize the same effects as those in the third aspect of the present invention.

In a tenth aspect according to the present invention, a controlling method for the vehicle apparatus, having a motor for driving a vehicle or supporting an output from the vehicle's engine and a plurality of batteries which are connected to each other for storing energy which is generated by the motor and energy which is regenerated by regenerating operation of the motor when the vehicle is decelerated and a cooling fan which sends cooling air to the batteries, comprises steps of a temperature measuring step for measuring the temperature in each battery, a temperature difference calculating step for calculating temperature difference among batteries, a controlling step for setting and controlling current value sent to the cooling fan according to the temperature difference among batteries, a speed measuring step for measuring driving speed of the vehicle, and an current limiting step for limiting the current according to the driving speed of the vehicle.

By doing this, it is possible to realize the same effects as those in the fourth aspect of the present invention.

In an eleventh aspect according to the present invention, a controlling method for the vehicle apparatus has a limitation clearing step for canceling the limitation for the current made in the current limiting step under conditions in which the temperature of the batteries rises higher than a predetermined limitation for highest temperature.

By doing this, it is possible to realize the same effects as those in the fifth aspect of the present invention.

In a twelfth aspect according to the present invention, a controlling method for the vehicle apparatus has a limitation canceling step which cancels the limitation made by the current limiting device when information for the driving speed of the vehicle cannot be obtained from the speed measuring device for a predetermined period of time under conditions in which electricity is charged to or discharged from the batteries.

By doing this, it is possible to realize the same effects as those in the sixth aspect of the present invention.

As explained above, according to a temperature controlling apparatus for battery according to the first aspect of the present invention, it is possible to set the current which is sent to the cooling fan according to the temperature difference among a plurality of batteries which are connected to each other so as to control the cooling air.

Therefore, there is an effect in that the temperature of each battery can be lowered by generating an air flow by using a cooling air which is sent from the cooling fan when the temperature is different among a plurality of batteries. Also, there is an effect in that the temperature difference among the batteries can be solved.

Such effects can be obtained by performing a controlling method according to the seventh aspect of the present invention.

According to a temperature controlling apparatus for batteries according to the second aspect of the present invention, it is possible to set the current which is sent to the cooling fan according to the priority between the temperature difference among a plurality of batteries which are connected to each other and the temperature of the battery so as to control the cooling air.

Therefore, an effect in that the temperatures of the batteries can be controlled reliably when temperature of all the batteries rise without temperature difference among a plurality of battery. That is, by generating an air flow by using a cooling air which is sent form the cooling fan, it is possible to deal with a case in which the temperatures of all the batteries rise and a case in which the temperature of any battery rises.

Such an effect can be obtained by performing the controlling method according to the eighth aspect of the present invention.

According to a temperature controlling apparatus for batteries according to the third aspect of the present invention, it is possible to determine the condition of the each battery from viewpoints of the temperature of the battery and the heat generated so as to set the current which is sent to the cooling fan.

Therefore, there is an effect in that the heat generation and the temperature of the battery can be forecasted so as to anticipate the increase of the battery temperature according to the heat generation in advance to the actual increase of the temperature of the battery. Therefore, it is possible to control the cooling air without control time lag.

Such effect can be obtained by performing the controlling method according to the ninth aspect of the present invention.

According to a vehicle apparatus according to the third aspect of the present invention, it is possible to set the current which is sent to the cooling fan according to the temperature difference among a plurality of batteries which are connected to each other and change the current which is sent to the cooling fan according to the driving speed of the vehicle. Thus, it is possible to control the cooling air.

Therefore, there is an effect in that it is possible to lower the temperature of each battery by generating an air flow by using an air which is sent from the cooling fan so as to solve the temperature differences among batteries when the temperature is different among a plurality of batteries which are carried in the vehicle. Also, it is possible to control the cooling air such that the air noise is restricted so as not to affect the passengers in the vehicle according to the driving speed (driving condition) of the vehicle.

Such effects can be obtained by performing the controlling method according to the tenth aspect of the present invention.

According to a vehicle apparatus according to the fifth aspect of the present invention, it is possible to send a cooling air to the battery regardless of the driving speed of the vehicle because the limitation for the current which is sent to the cooling fan is cleared when the temperature of the battery exceeds the predetermined limitation for highest temperature in the battery.

Therefore, there is an effect in that it is possible to control the cooling air from the cooling fan such that the performance of the battery is not deteriorated while restricting the air noise within tolerable range for the passengers in the vehicle during the control of the cooling air from the cooling fan. Thus, it is possible to control the temperature of the battery reliably.

Such effects can be obtained by performing the controlling method according to the eleventh aspect of the present invention.

According to a vehicle apparatus according to the sixth aspect of the present invention, it is possible to send a cooling air to the battery regardless of the driving speed of the vehicle because the limitation for the current which is sent to the cooling fan is cleared when information for the driving speed of the vehicle cannot be obtained for a predetermined period of time.

Therefore, there is an effect in that it is possible to control the cooling air from the cooling fan according to the temperature of batteries such that the performance of the battery is not deteriorated while restricting the air noise within a tolerable range for passengers in the vehicle during the control of the cooling air from the cooling fan. Thus, it is possible to control the temperature of the battery reliably.

Such effects can be obtained by performing the controlling method according to the twelfth aspect of the present invention.

In the vehicle apparatus according to the present invention, the current which is sent to the cooling fan is controlled under conditions that the temperature difference among the batteries takes priority over the temperature of each battery. Also, the current which is sent to the cooling fan is controlled under conditions that the vehicle speed takes priority over the temperature difference among batteries. Furthermore, the vehicle apparatus controls the current which is sent to the cooling fan under conditions that the temperature of the components in the inverter device is the top priority among the above-explained conditions.

Therefore, there is an effect in that it is possible to control the cooling air from the cooling fan such that the performance of the inverter device which supplies current to a power supply for driving the vehicle is not deteriorated while restricting the air noise within a tolerable range for passengers in the vehicle. Thus, it is possible to control the temperature of the battery reliably.

Also, by determining the condition of the each battery from view points of the temperature of the battery and the heat generated so as to set the current which is sent to the cooling fan, there is an effect in that the heat generation can be forecasted so as to anticipate the increase of the battery temperature according to the heat generation in advance of the actual increase of the temperature of the battery. Therefore, it is possible to control the cooling air without control time lag.

BRIEF DESCRIPTION OF THE DRAWINGS

FIG. 8 is a view showing a waveform as a result for a controlling operation for a cooling fan for a temperature controlling apparatus for batteries according to the first embodiment.

DETAILED DESCRIPTION OF THE INVENTION

Hereafter, the embodiments according to the present invention are explained with reference to the drawings as follows.

Figure 1:
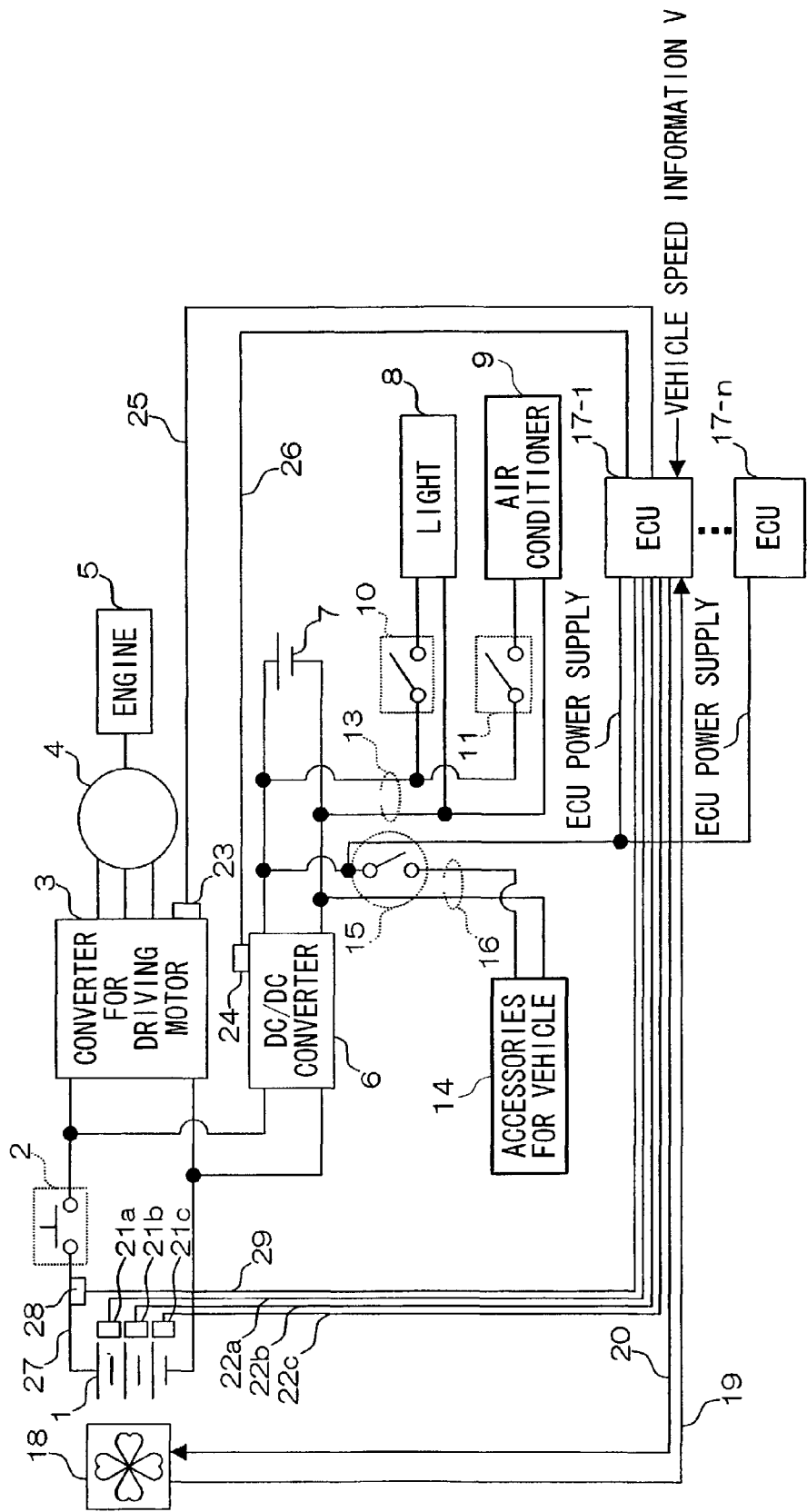
FIG. 1 is a block diagram showing a structure and wiring for the electric components for a vehicle including a temperature controlling apparatus for batteries according to a first embodiment of the present invention.

FIG. 1 is a block diagram showing a structure and wiring for the electric components for a vehicle including a temperature controlling apparatus for batteries according to a first embodiment of the present invention.

In FIG. 1, reference numeral 1 indicates a high-voltage (for example, 144 [V]) battery of which voltage is higher than 12 [V] in which a plurality (for example, three pieces) of battery are connected in series as an electric power supply for supplying electrical power to each component in the vehicle. Reference numeral 2 indicates a high-voltage switch for switching a wiring so as to determine whether or not the current of the high-voltage battery 1 is supplied to each component in the vehicle.

Reference numeral 3 indicates an inverter for driving a motor for inverting the current which is supplied from the high-voltage battery 1 via the high-voltage switch 2 into 3-phase current which is to be supplied to a 3-phase AC motor 4 for generating a driving force for driving the vehicle.

Also, to the 3-phase AC motor 4, an engine which is used for driving a car by combusting a fuel not by using current is connected. Here, a vehicle is driven only by the engine 5 or by the engine 5 and the 3-phase AC motor which support the output from the engine 5.

Here, the high-voltage battery 1 is charged by a regenerated energy which is produced by the 3-phase AC motor 4 via the inverter 3 for driving the motor. Also, it is acceptable that an alternator for generating current by using a rectifying circuit and the engine can be connected to the high-voltage battery 1 via a high-voltage switch 2 when the voltage in the high-voltage battery 1 is, for example, 42 [V].

Also, a DC/DC converter 6 converts the current which is supplied from the high-voltage battery 1 via the high-voltage switch 2 into an current having 12 [V] which is supplied as a power supply to a computers provided at various parts in the vehicle for controlling the vehicle and accessories such as lighting devices, air conditioners, and fuel pumps.

Also, to an output line of the DC/DC converter 6, a 12V battery 7 to which the converted current having 12 [V] is charged is connected. Furthermore, to the output line (both ends of the 12V battery 7) of the DC/DC converter 6, the accessories for the vehicle such as a lighting device 8 and the air conditioner 9 are connected in parallel via switches.

Connection for accessories is explained in detail as follows. A light 8 is a head light for lighting ahead of the vehicle. The light 8 is connected to the DC/DC converter 6 and the 12V battery 7 via a light switch 10 which is operated by an occupant in the vehicle. An air conditioner 9 is used in the vehicle. The air conditioner 9 is connected to the DC/DC converter 6 and the 12V battery 7 in parallel via an air conditioner switch 11 which is operated by an occupant in the vehicle. Here the light switch 10 and the air conditioner switch 11 are inserted into a plus terminal for a connection line 13 which connects the DC/DC converter, the 12V battery 7, and accessories therefor. The light switch 10 and the air conditioner switch 11 perform switching operation between the DC/DC converter 6, the 12V battery 7, and the accessories by operation performed by the occupant in the vehicle.

Also, to an output line (both ends of the 12V battery 7) of the DC/DC converter 6, vehicle accessories 14 such as fuel pump motor which are carried on various part of the vehicle are connected via an ignition switch 15 for switching the current which is supplied to the vehicle accessories 14. Here, the ignition switch 15 is inserted into a plus terminal for the connection line 16 which connects the DC/DC converter 6, the 12V battery, and the vehicle accessories 14. The current is supplied to the vehicle accessories 14 when the ignition switch 15 is closed by the passenger in the vehicle.

Furthermore, to the output line (both ends of the 12V battery 7) of the DC/DC converter 6, a plurality of electric control unit (hereinafter called ECU) 17-1 to 17-$n$ ($n$ is an integer) which are computers provided in various part in the vehicle for controlling the vehicle are connected in parallel.

Also, a cooling fan 18 cools the high-voltage battery 1, the inverter 3 for driving a motor, and DC/DC converter 6. A connection line 19 which notifies the rotating speed of the cooling fan from the cooling fan 18 is connected only to the ECU 17-1 among a plurality of ECU 17-1 to 17-$n$. Also, between the ECU 17-1 and the cooling fan 18, a connection line 20 which is used for the ECU 17-1 to control the rotation speed of the cooling fan 18 by a control DUTY value (current which is sent to the cooling fan 18) for Pulse Width Modulation (hereinafter called PWM) is connected. Here, the ECU 17-1 absorbs the slight change in the rotation which is caused by difference of accuracy existing in the products which is produced in the mass-production and the increase of friction in the rotational axis of the cooling fan 18 by monitoring the rotation of the cooling fan by the connection line 19 and feeding back the monitoring result to the control DUTY value so as to maintain the cooling air uniformly.

Also, near the high-voltage battery 1, temperature sensors 21$a$, 21$b$, and 21$c$ are provided which measure the temperature of each battery contained in the high-voltage battery 1 which is used for determining the control DUTY value of the cooling fan 18 by the ECU 17-1. From the temperature sensors 21$a$, 21$b$, and 21$c$, connection lines 22$a$, 22$b$, and 22$c$ which notify the measured temperature to the ECU 17-1 are connected to the ECU 17-1. Here, in the embodiments of the present invention, a total of 3 temperature sensors are prepared so as to correspond to the 3 batteries which are connected in series in the high-voltage battery 1.

Similarly, near the inverter 3 for driving a motor and the DC/DC converter 6, temperature sensors 23 and 24 are provided which measures the temperature of the inverter 3 for driving a motor and the DC/DC converter 6 such that the measured temperature value is used for the ECU-1 to determining the control DUTY value for the cooling fan 18. From the temperature sensors 23, 24, connection lines 25 and 26 which notify the ECU 17-1 of the measured temperature are connected to the ECU Also, to the connection line 27 which connects the high-voltage battery 1 and the high-voltage switch 2, an current sensor 28 is provided for measuring the current which is charged to and discharged from the high-voltage battery 1 such that the ECU 17-1 forecasts the heat generation in the high-voltage battery 1 which is used for determining the control DUTY value of the cooling fan 18. The amount of the current which is charged to and discharged from the high-voltage battery 1 is notified to the ECU 17-1 via the connection line 29. Here, the heat generation W in the high-voltage battery 1 can be determined by a following formula F1 under condition that $r[\Omega]$ is an internal resistance in the high-voltage battery 1 and $I[A]$ is an current which is charged to and discharged from the high-voltage battery 1.

$$W = r \times (I^2) \qquad \text{F1}$$

Here, it is understood that W is in proportion to a value such as ($I^2$); thus, the W can be forecasted in advance. Here, when r as an internal resistance is used, W as a heat generation can be forecasted accurately. If ($I^2$) is calculated while omitting the r as an internal resistance, degree of heat generation in the high-voltage battery 1 can be forecasted. Here, ($I^2$) indicates a square of I as an current which is charged to and discharged from the high-voltage battery 1.

Also, to the ECU 17-1, a vehicle speed information V which is used for the ECU 17-1 to determine the control DUTY value of the cooling fan 18 is input from a vehicle speed sensor (not shown in FIG. 1) which measures the driving speed of the vehicle.

Structure and the wiring condition of the electrical component such as a temperature controlling apparatus for the battery in the vehicle of an embodiment according to the present invention are explained as above. Next, an example for carrying the temperature controlling apparatus for a battery in the present embodiment is explained with reference to the drawings as follows.

Figure 2:
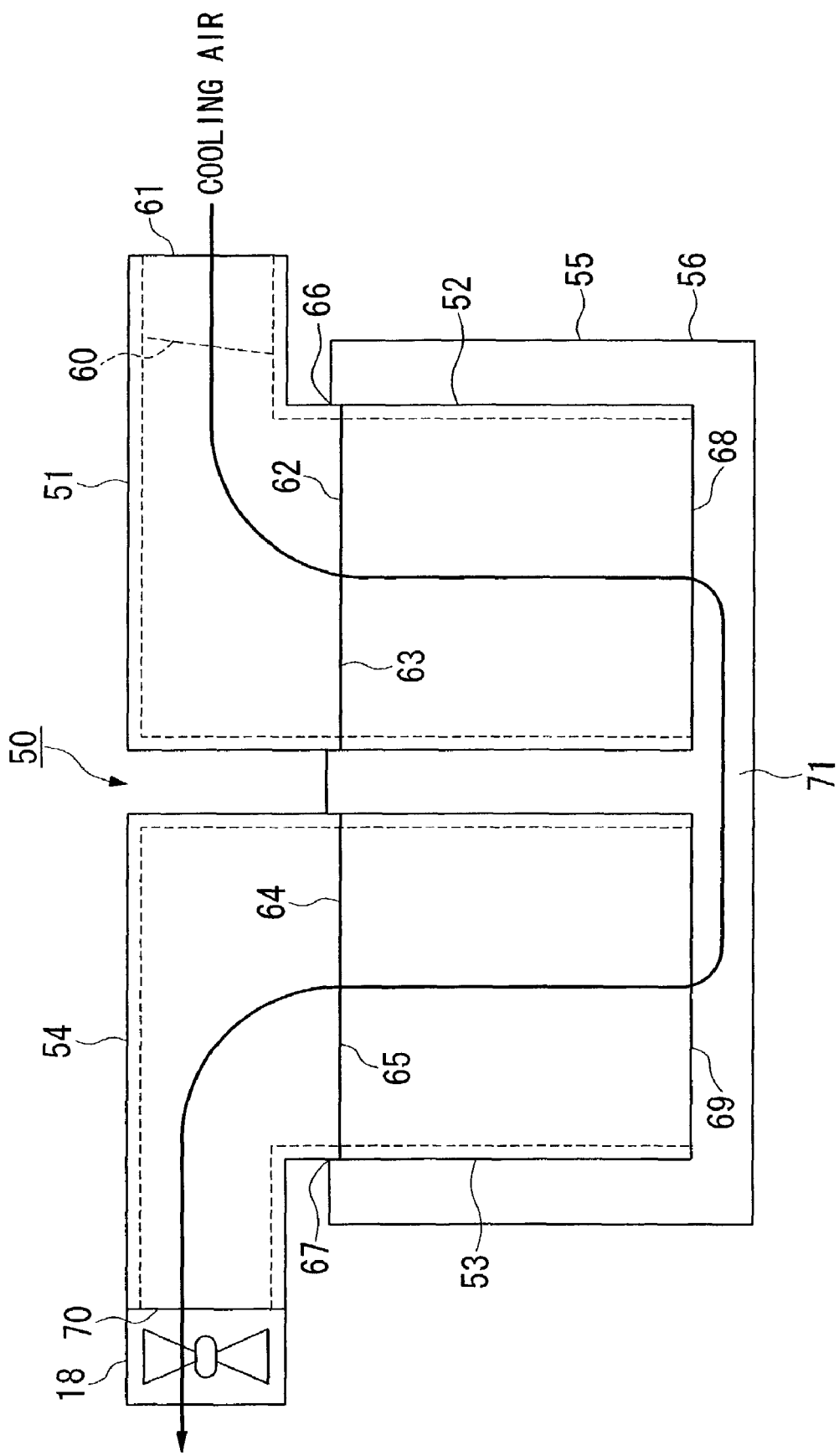
FIG. 2 is a view showing a structure which is used for carrying the temperature controlling apparatus for batteries according to the first embodiment in the vehicle.

FIG. 2 is a view showing a structure of a high-voltage electric components cooling apparatus 50 which is used for carrying the temperature controlling apparatus for batteries according to the first embodiment on the vehicle. As shown in FIG. 2, a high-voltage electric components cooling apparatus 50 is provided with a suction duct 51, a battery box 52, a heat sink case 53, an exhaust duct 54, and an exterior enclosure box 55. Here, a cooling fan 18 which is explained with reference to FIG. 1 is provided on the tip of the exhaust duct 54. Also, an electric component box is made from the battery box 52, the heat sink case 53, and the exterior enclosure box 55.

Here, the suction duct 51 has a cooling air intake port 61 which is opened and closed by a shutter 60. The battery box 52 has a box structure. A top opening section 62 is communicated through a bottom opening section 63 in the suction duct 51. Inside of the battery box 52, the high-voltage battery 1 which was explained with reference to FIG. 1 is attached such that the cooling air can communicate therethrough. Heat sink 53 also has a box structure. A top opening section 64 is communicated through a bottom opening section 65 in the exhaust duct 54. In the heat sink case 53, the heat sink is provided such that the cooling air can pass therethrough. On the outside of the heat sink case 53, the inverter 3 for driving a motor shown in FIG. 1 and the DC/DC converter 6 are provided.

In addition, the battery box 52, the heat sink case 53, the inverter 3 for driving motor, and the DC/DC converter 6 are enclosed by the exterior enclosure box 55. The exterior enclosure box 55 has an air-tight box which has openings 66 and 67 on its top. One of the opening 66 communicates a connected section in a sealing manner at which the bottom opening 63 of the suction duct 51 and the top opening 62 of the battery box 52 are connected. The other opening 67 communicates a connected section in a sealing manner at which the bottom opening 65 of the exhaust duct 54 and the top opening 64 of the heat sink case 53 are connected. Also, in an internal space of the exterior enclosure box 55, a bottom opening 68 of the battery box 52 and the bottom opening 69 of the heat sink case 53 are communicating.

The exhaust duct 54 has a cooling air exhaust port 70. In the cooling air exhaust port 70, a cooling fan 18 is provided. Also, the cooling fan and the shutter 60 acts synchronously; thus, when the cooling fan 18 rotates, the shutter 60 opens, and when the cooling fan 18 stops, the shutter 60 is closed.

In the high-voltage electric components cooling apparatus 50, when the cooling fan 18 rotates, the shutter 60 is opened; thus, the cooling air is introduced from the cooling air intake port 61 into the suction duct 51. The cooling air which is introduced into the suction duct 51 is exhausted to the exterior enclosure box 55 from the bottom opening 68 through the battery box 52 from the suction duct 51. Consequently, the cooling air exchanges heat with the high-voltage battery 1 when the cooling air passes in the battery box 52. As a result, the high-voltage battery 1 is cooled, and the temperature of the cooling air slightly rises; thus, the cooling air is exhausted to the exterior enclosure box 55. Here, because the operational temperature of the high-voltage battery 1 is low, even if the temperature of the cooling air rises during the cooling operation for the high-voltage battery 1, it is still low enough to cool the inverter 3 for driving motor and the DC/DC converter 6.

The cooling air which is exhausted to the exterior enclosure box 55 is introduced into the heat sink case 53 because the exterior enclosure box 55 has an air tight structure. That is, the inside of the exterior enclosure box 55 becomes a cooling air flow path 71 for introducing the cooling air after cooling the high-voltage battery 1 into the inverter 3 for driving motor. The cooling air which is introduced into the heat sink case 53 is exhausted to the exhaust duct 54 throught the heat sink case 53. Furthermore, the cooling air is absorbed by the cooling fan 18 via the cooling air exhaust port 70 so as to be exhausted the outside. In addition, the cooling air exchange heat with the heat sink when the cooling air passes in the heat sink case 53. Heat in the inverter 3 for driving motor and the DC/DC converter 6 is transferred to the heat sink via the heat sink case 53; therefore, the inverter 3 for driving motor and the DC/DC converter 6 are cooled by the heat exchange between the cooling air and the heat sink.

As explained above, in the high-voltage electric components cooling apparatus 50, the cooling air is enforced to pass by a cooling fan 18 so as to cool the inverter 3 for driving motor and the DC/DC converter 6 by the cooling air after cooling the high-voltage battery 1 while taking a fact that the temperature in the inverter 3 for driving motor and the DC/DC converter 6 are higher than the operational temperature of the high-voltage battery 1 into account. Therefore, it is possible to cool the high-voltage battery 1, inverter 3 for driving motor, and the DC/DC converter 6 efficiently by less cooling energy in an efficient manner.

In a vehicle apparatus having a temperature controlling apparatus for battery according to the present embodiment, a high-voltage electric components cooling apparatus 50 is provided between, for example, the rear seat and a trunk room of an automobile so as to introduce the air in the vehicle room into the suction duct 51 from the cooling air intake port 61 in the suction duct 51 via an opening section which is formed in a rear tray of the automobile.

Next, movement in the present embodiment is explained with reference to drawings as follows.

Figure 3:
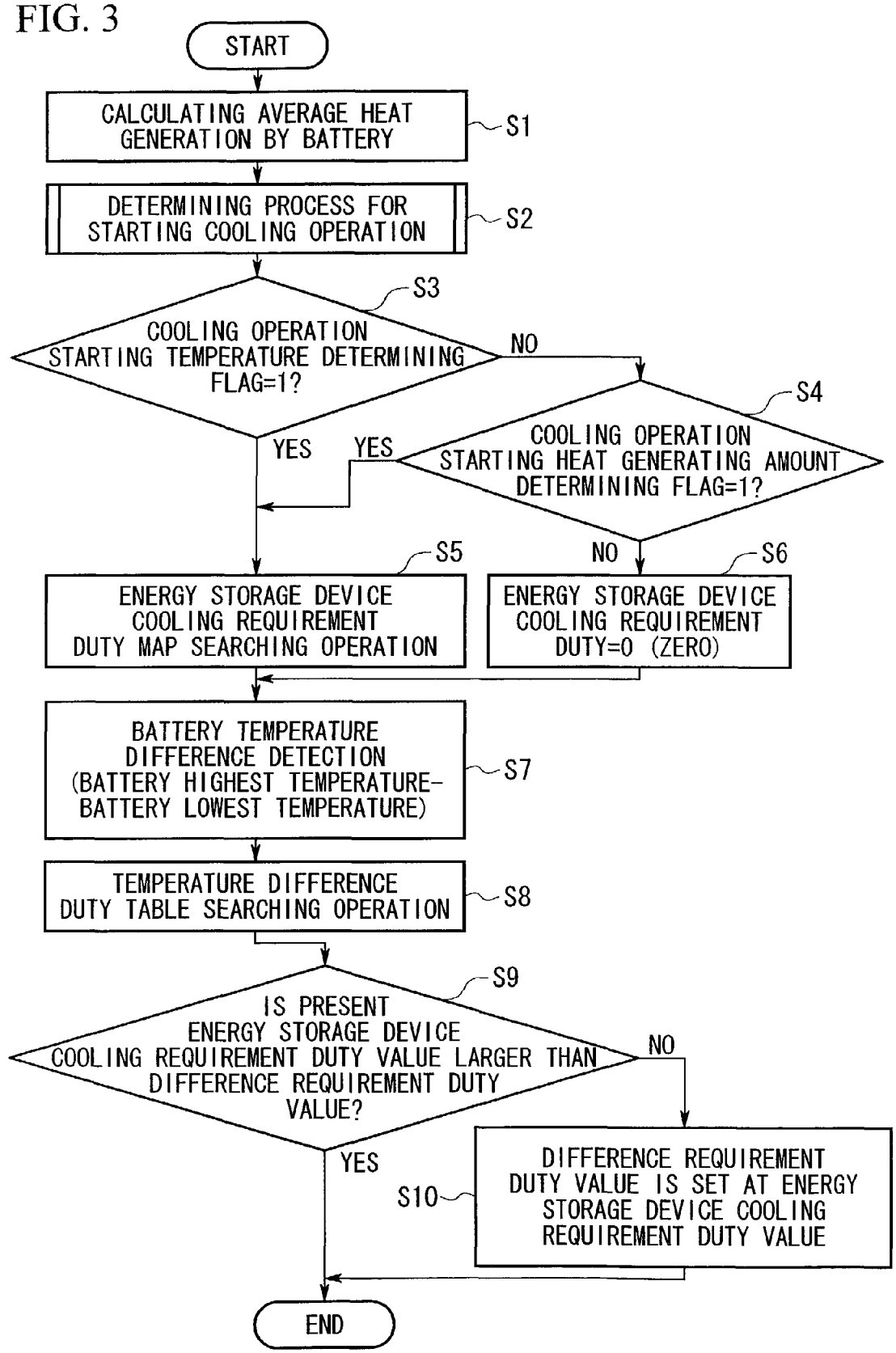
FIG. 3 is a flow chart showing an energy storage device cooling requirement DUTY value searching operation for a temperature controlling apparatus for batteries according to the first embodiment.

FIG. 3 is a flow chart showing an energy storage device cooling requirement DUTY value searching operation for a temperature controlling apparatus for battery according to the first embodiment. Here, for an energy storage device, a battery and a capacitor can be named. Also, an energy storage device cooling requirement DUTY value searching operation indicates a movement in which a control DUTY value which is required for driving the cooling fan 18 based on the temperature and the heat generation of the high-voltage battery 1 is determined for cooling the high-voltage battery 1.

In FIG. 3, first, the ECU 17-1 measures current which is charged to and discharged from the high-voltage battery 1 flowing in the connection line 27 by the current sensor 28 so as to calculate the average heat generation of the high-voltage battery 1 based on the above-mentioned formula F1 (step S1).

Next, the ECU 17-1 performs a cooling operation start determining operation (step S2) in which whether or not the temperature of the high-voltage battery 1 which is measured by the temperature sensors 21a, 21b, and 21c, and the average heat generation in the high-voltage battery 1 which is calculated in the step S1 are higher than the predetermined limitation for highest temperature or the predetermined limitation for highest heat generation is determined.

Consequently, as a result of the cooling operation start determining process, it is determined whether a cooling operation start temperature determining flag, which indicates that the temperature of the high-voltage battery 1 is higher than the predetermined limitation for highest temperature, indicates "1 (one)" (when the temperature of the high-voltage battery 1 is higher than the predetermined limitation for highest temperature, the flag indicates "1 (one)") (step S3).

In the step S3, in case in which the temperature of the high-voltage battery 1 is not higher than the predetermined limitation for highest temperature (No in the step S3), it is determined whether a cooling operation start heat generation determining flag, which indicates that the heat generation of the high-voltage battery 1 is higher than the predetermined limitation for highest heat generation, indicates "1 (one)" (when the heat generation of the high-voltage battery 1 is higher than the predetermined limitation for highest heat generation, the flag indicates "1 (one)") (step S4).

In the step S3, in case in which the temperature of the high-voltage battery 1 is higher than the predetermined limitation for highest temperature (YES in the step S3), or in the case in which the heat generation of the high-voltage battery 1 is higher than the predetermined limitation for the highest heat generation in the step S4 (YES in the step S4), in order to cool the high-voltage battery 1, an energy storage device cooling operation requirement DUTY map searching process is performed (step S5) so as to determine the energy storage cooling operation requirement DUTY value (a first setting value, a first current) based on the temperature and the heat generation so as to notify the cooling fan 18.

In the energy storage cooling operation requirement DUTY map searching process, the control DUTY value is determined on a Z-axis which is required for PWM control for the cooling fan 18 according to a three dimensional map in which the highest temperature which is represented on an X-axis and the generate heat of the high-voltage battery 1 on a Y-axis. Here, the above-mentioned three-dimensional map is set such that the control DUTY value which is required for PWM control for the cooling fan 18 increases (rotation of the cooling fan 18 increase) when the highest temperature in the high-voltage battery 1 rises, or the heat generation in the high-voltage battery 1 increases.

On the other hand, in the step S4, in a case in which the heat generation in the high-voltage battery 1 is not higher than the predetermined limitation for highest heat generation (NO in step S4), "0 (zero)" is set for the energy storage cooling operation requirement DUTY value (step S6).

Also, after the energy storage device cooling operation requirement DUTY value is determined in the steps S5 or S6, next, the ECU 17-1 deducts the lowest temperature which is shown in one of the batteries from the highest temperature which is shown in other one of the batteries in the temperature which is measured by the temperature sensors 21a, 21b, and 21c so as to determine differences in the temperature among a plurality of battery in the high-voltage battery 1 (step S7).

Accordingly, a temperature difference DUTY table search is performed according to the measured temperature difference (step S8).

According to the result of the temperature difference DUTY table search, in order to solve the temperature difference among a plurality of batteries, after the difference requirement DUTY value (a second setting value, a second current) which is required for the cooling fan 18 is obtained, it is determined whether or not the present energy storage device cooling operation requirement DUTY value is larger than the difference requirement DUTY value (step S9).

In the step S9, in a case in which the present energy storage device cooling operation requirement DUTY value is larger than the difference requirement DUTY value (YES in the step S9), the energy storage device cooling operation requirement DUTY value searching operation is over without performing any particular operation.

Also, in a case in which the present energy storage device cooling operation requirement DUTY value is smaller than the difference requirement DUTY value (NO in the step S9), the difference requirement DUTY value is set for the energy storage device cooling operation requirement DUTY value (step S10), and the energy storage device cooling operation requirement DUTY value searching operation is over.

Next, the cooling operation start determining process for the energy storage device cooling operation requirement DUTY value searching operation in the temperature controlling apparatus for batteries is explained with reference to the drawings.

Figure 4:
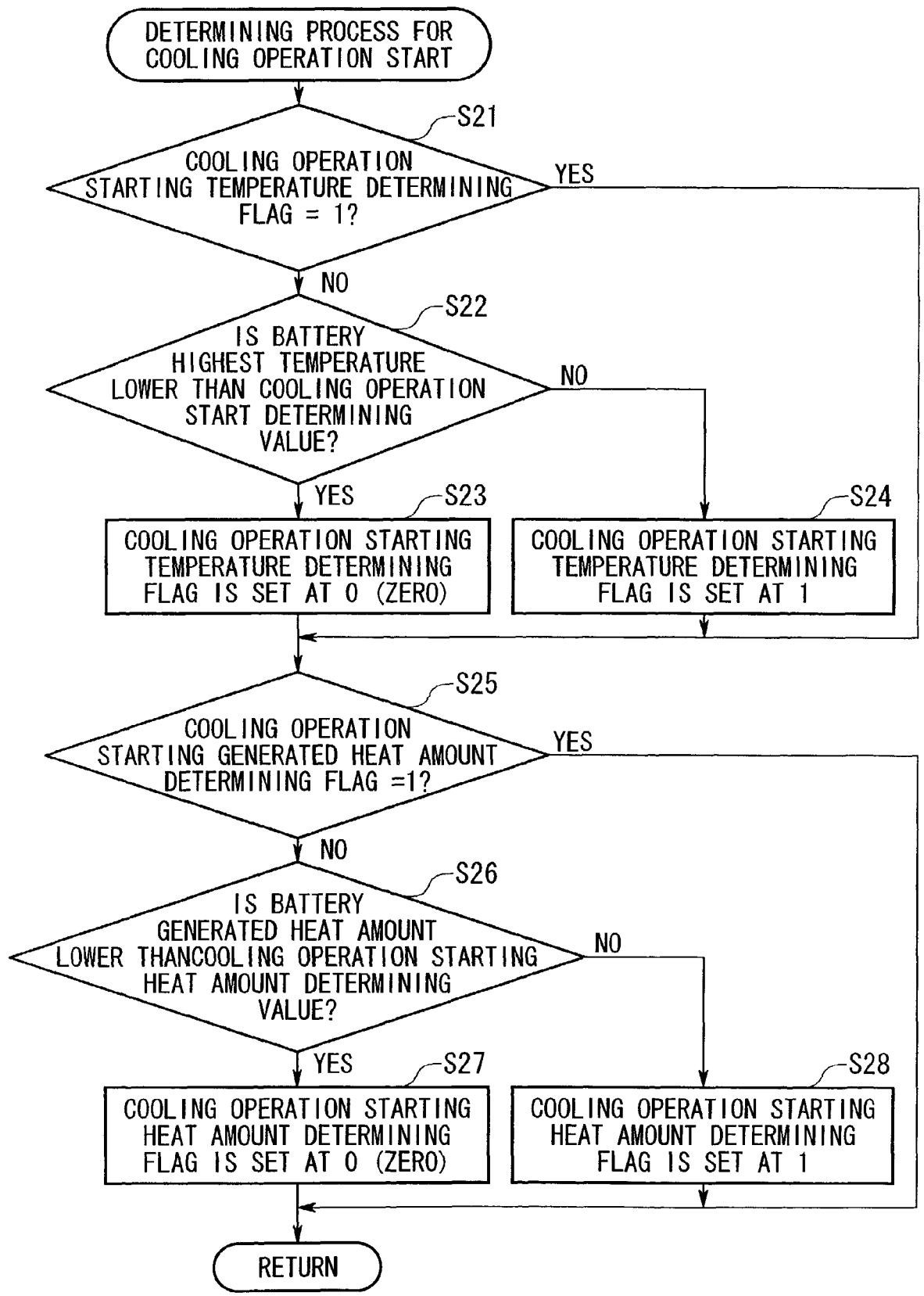
FIG. 4 is a flow chart showing a cooling operation start determining process for a temperature controlling apparatus for batteries according to the first embodiment.

FIG. 4 is a flow chart showing a cooling operation start determining process for a temperature controlling apparatus for batteries according to the present embodiment.

In FIG. 4, first, the ECU 17-1 determines whether or not the cooling operation starting temperature determining flag is. "1 (one)" (when the temperature in the high-voltage battery 1 is higher than the predetermined limitation for highest temperature, the flag is "1 (one)") (step S21).

In the step S21, in a case in which the cooling operation starting temperature determining flag is not "1 (one)" (NO in the step S21), it is determined whether or not the highest temperature in the high-voltage battery 1 is higher than the cooling operation starting temperature determination value (step S22).

In the step S22, in a case in which the highest temperature in the high-voltage battery 1 is lower than the cooling operation starting temperature determination value (YES in the step S22), "0 (zero)" is set for the cooling operation starting temperature determination flag (step S23).

Also, in the step S22, in a case in which the highest temperature in the high-voltage battery 1 is higher than the cooling operation starting temperature determination value (NO in the step S22), "1 (one)" is set for the cooling operation starting temperature determination flag (step S24).

On the other hand, in the step S21, in case in which the cooling operation starting temperature determination flag is "1 (one)" (YES in the step S21), nothing particular is performed in the step so as to progressed to the next step S25.

Next, the ECU 17-1 determines whether or not the cooling operation starting heat generation determination flag is "1 (one)" (when the heat generation in the high-voltage battery 1 is higher than the predetermined limitation for highest heat generation, the flag is "1 (one)") (step S25).

In the step S25, in a case in which the cooling operation starting heat generation determination flag is not "1 (one)" (NO in the step S25), it is determined whether or not the heat generation in the high-voltage battery 1 is lower than the cooling operation starting heat generation determination value (step S26).

In the step S26, in a case in which the heat generation in the high-voltage battery 1 is lower than the cooling operation starting heat generation determination value (YES in the step S26), "0 (zero)" is set in the cooling operation starting heat generation determination flag so as to finish the cooling operation starting determining process (step S27).

Also, in the step S26, the heat generation in the high-voltage battery 1 is higher than the cooling operation starting heat generation determination value (NO in the step S26), "1 (one)" is set for the cooling operation starting heat generation determining flag so as to finish the cooling operation starting determining process (step S28).

On the other hand, in the step S25, in a case in which the cooling operation heat generation flag is "1 (one)" (YES in the step S25), no particular process is performed and the cooling operation starting determining process is finished.

Next, an operation for the control DUTY value output in the temperature controlling apparatus for battery according to the present embodiment is explained with reference to the drawings.

Figure 5:
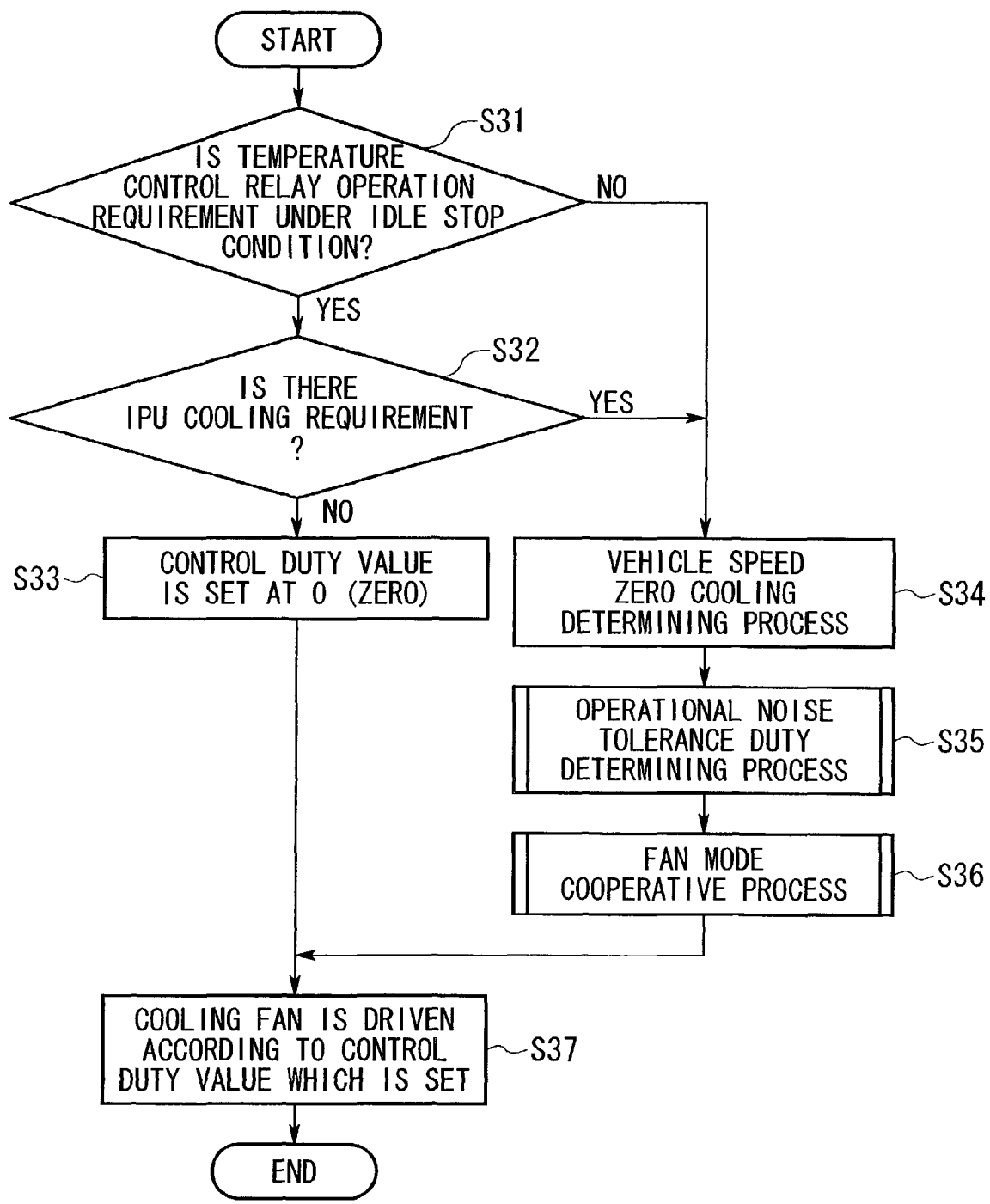
FIG. 5 is a flow chart showing a control DUTY value outputting operation for a temperature controlling apparatus for batteries according to the first embodiment.

FIG. 5 is a flow chart showing a control DUTY value outputting operation for a temperature controlling apparatus for batteries according to the present embodiment. Here, in the control DUTY value outputting operation, actual control DUTY value for the cooling fan 18 is obtained so as to drive the cooling fan 18 by taking the energy storage device cooling requirement DUTY value which is determined by the energy storage device cooling operation requirement DUTY value searching operation in the steps S1 to S10 and a tolerable noise level in the cooling fan 18 into account according to the cooling requirement from a power supply unit such as the inverter 3 for driving motor and the DC/DC converter 6.

In FIG. 5, first, the ECU 17-1 determines whether or not the temperature control relay operation requirement is under idle stop condition (step S31).

In the step S31, in a case in which the temperature control relay operation requirement is under idle stop condition (YES in the step S31), it is determined whether or not there is an Integrated Power Unit (hereinafter called IPU) cooling operation requirement (step S32) Here, for an IPU, a power supply unit such as inverter 3 for driving motor or DC/DC converter 6 can be named. Also, the IPU cooling operation requirement is a signal for requiring for cooling the inverter 3 for driving motor and the DC/DC converter 6 in a case the temperature which is measured by the temperature sensors 23 and 24 which are provided in the inverter 3 for driving motor and the DC/DC converter 6 which are enclosed together with the battery box 52 and the heat sink case 53 by the exterior enclosure box 55 is higher than the predetermined limitation for highest temperature for components such as inverter 3 for driving motor and DC/DC converter 6. That is, the IPU cooling operation requirement DUTY value which is explained later (a fourth current) is a control DUTY value for the cooling fan 18.

Therefore, in the step S32, in a case in which there is not the IPU cooling operation requirement (NO in the step S32), the high-voltage battery 1 does not have to cool the inverter 3 for driving motor and the DC/DC converter 6; thus, "0 (zero)" is set for the control DUTY value (step S33).

On the other hand, in the step S33, in a case in which the temperature control relay operation requirement is not under idle stop condition (NO in the step S31), or in a case in which there is an IPU cooling operation requirement in the step S32 (YES in the step S32), at first, a vehicle speed zero cooling operation determining process is performed (step S34). Here, in the vehicle speed zero cooling operation determining process, it is determined whether or not a vehicle speed information is correct so as to determine whether or not a vehicle speed information which can be a reference for determining whether or not a tolerable level is realized in the operational noise tolerance DUTY determining process which is explained later. When the vehicle speed information is abnormal, "1 (one)" is set for a low vehicle speed flag.

Next, the operational noise tolerance DUTY determining process is performed (step S35) for determining the control DUTY value according to the tolerable noise level of the cooling fan 18 based on the vehicle speed. Here, the detail of the operational noise tolerance DUTY determining process is explained later.

Also, the actual control DUTY value is determined according to the tolerable noise level of the cooling fan 18 dependent on the vehicle speed is determined for the control DUTY value which is required for the temperature and the heat generation of the high-voltage battery 1 in the operational noise tolerance DUTY determining process. Consequently, the control DUTY value which is required for the high-voltage battery 1 (energy storage device) are cooperated to the control DUTY value which is required for the inverter 3 for driving motor and the DC/DC converter 6 (IPU) and the like. Furthermore, a fan mode cooperative process is performed for determining the final control DUTY value (step S36). The detail of the fan mode cooperative process is explained later.

In addition, after the control DUTY value is determined in the above-explained step S33 or the step S36, it is outputted to the cooling fan 18 so as to perform the cooling fan control according to the determined control DUTY value (step S37).

Next, an operational noise tolerance DUTY determining process in the control DUTY value outputting operation for the temperature controlling apparatus for batteries is explained with reference to drawings.

Figure 6:
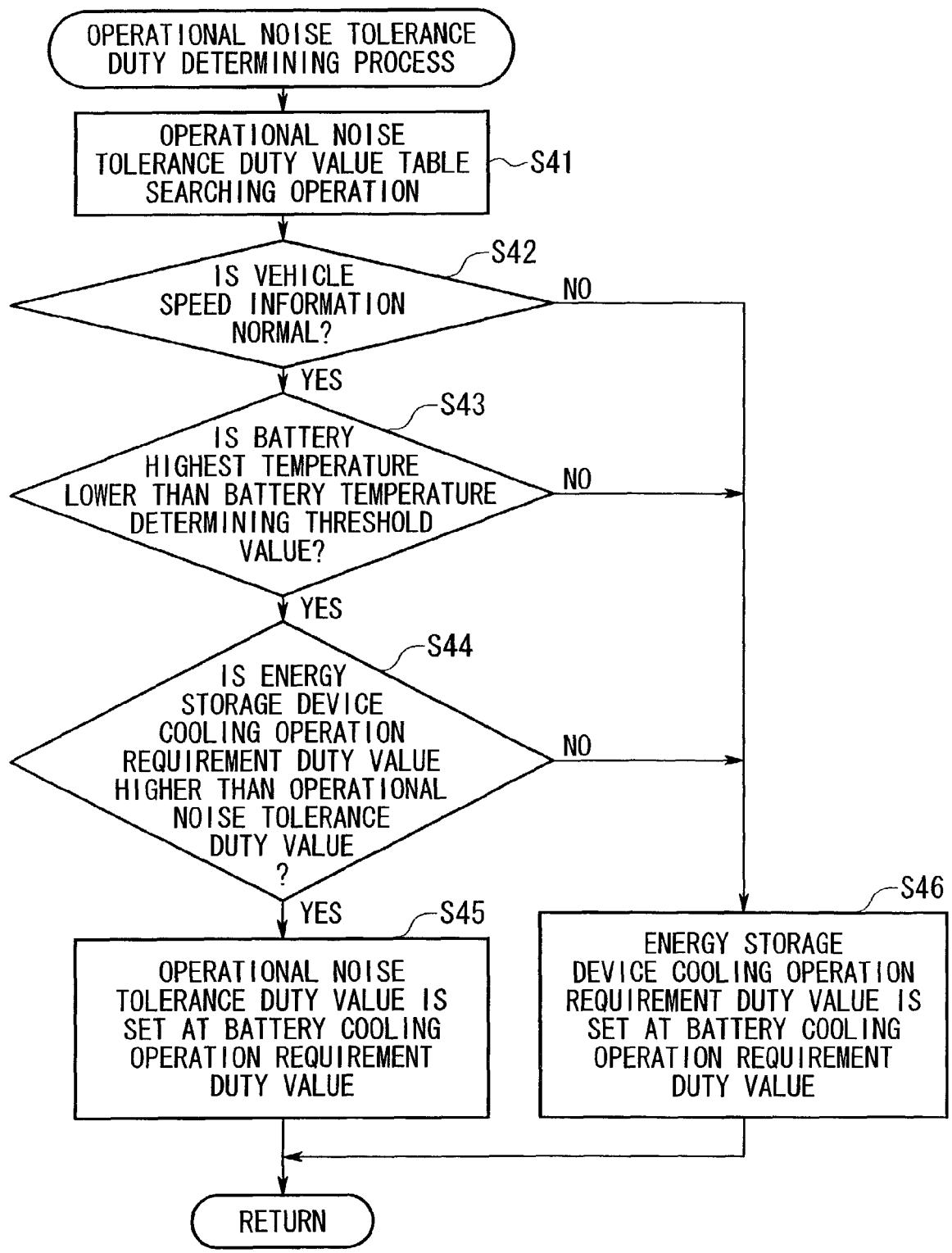
FIG. 6 is a flow chart showing an operational noise tolerance DUTY determining process for a temperature controlling apparatus for batteries according to the first embodiment.

FIG. 6 is a flow chart showing an operational noise tolerance DUTY determining process for a temperature controlling apparatus for batteries according to the present embodiment.

In FIG. 6, at first, the ECU 17-1 performs the operational noise tolerance DUTY value table search (step S41) for determining the operational noise tolerance DUTY value (a third current) in the vehicle speed which is shown in the vehicle speed information according to the operational noise tolerance requirement table which shows the control DUTY value limit for the cooling fan 18 such that the operational noise of the fan is tolerable for an occupant in the vehicle according to the vehicle speed based on the vehicle speed information which is obtained by the vehicle speed sensor (not shown in the drawing).

Next, it is determined whether or not the vehicle speed information is normal according to the low vehicle speed which is set in the vehicle speed zero cooling operation determining process (step S42).

In the step S42, in case in which the low vehicle speed flag is set at "0 (zero)" and the vehicle speed information is normal (YES in the step S42), it is determined whether or not the highest temperature in the high-voltage battery 1 is lower than battery temperature determining threshold (step S43).

Next, in the step S43, in a case in which the highest temperature in the high-voltage battery 1 is lower than the battery temperature determining threshold (YES in the step S43), it is determined whether or not the energy storage device cooling operation requirement DUTY value is higher than the operational noise tolerance DUTY value (step S44).

In addition, in the step S44, in a case in which the energy storage device cooling operation requirement DUTY value is higher than the operational noise tolerance DUTY value (YES in the step S44), the operational noise tolerance DUTY value is set for the battery cooling operation requirement DUTY value (step S45) so as to end the operational noise tolerance DUTY determining process.

On the other hand, the energy storage device cooling operation requirement DUTY value is set at the battery cooling operation requirement DUTY value (step S46) so as to end the operational noise tolerance DUTY determining process if either one of the following conditions occur such as, in the step S42, in a case in which the low vehicle speed flag is set at "1 (one)" and the vehicle speed information is abnormal (NO in the step S42), or in the step S43, in a case in which the highest temperature in the high-voltage battery 1 is higher than the battery temperature determining threshold (NO in the step S43), and furthermore, in the step S44, in a case in which the energy storage device cooling operation requirement DUTY value is lower than the operational noise tolerance DUTY value (NO in the step S44).

Next, a fan mode cooperative processing operation in the control DUTY value outputting operation for the temperature controlling apparatus for batteries is explained with reference to drawings.

Figure 7:
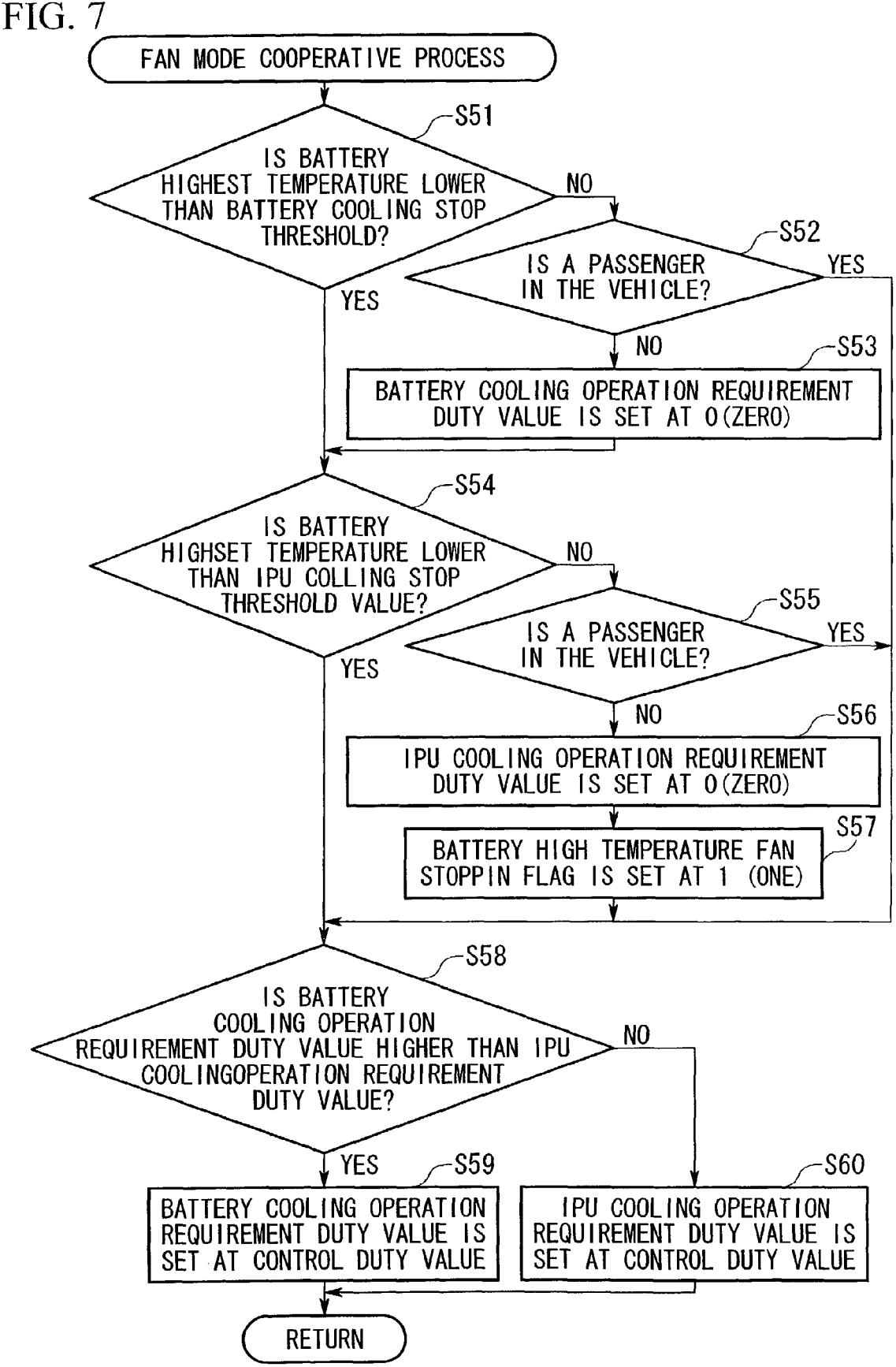
FIG. 7 is a flow chart showing fan mode cooperative process for a temperature controlling apparatus for batteries according to the first embodiment.

FIG. 7 is a flow chart showing fan mode cooperative process for a temperature controlling apparatus for battery according to the present embodiment.

In FIG. 7, at first, the ECU 17-1 performs a anti-high temperature idling process so as to prevent the high-voltage battery 1 from being heated because the cooling fan 18 works when a high-temperature air is introduced in the suction duct 51 from the cooling air intake port 61 in the suction duct 51 when an engine is under idle condition in high temperature atmosphere.

Here, in the anti-high temperature idling process, the cooling fan 18 is stopped when the temperature in the high-voltage battery 1 is higher than the predetermined limitation for highest temperature so as not to deteriorate the performance of the high-voltage battery 1 when temperature in the high-voltage battery 1 rises due to the cooling fan 18.

That is, at first, it is determined whether or not the highest temperature in the high-voltage battery 1 is lower than the battery cooling operation stop threshold (step S51).

In the step S51, in a case in which the highest temperature in the high-voltage battery 1 is higher than the battery cooling operation stoop threshold (NO in the step S51), it is determined whether or not a passenger is in the vehicle (step S52) according to signals which is outputted, for example, from the seat sensor (such as a load sensor or an infrared sensor) which are provided to the seats in the vehicle.

Consequently, in the step S52, in a case in which a passenger is not in the vehicle (NO in the step S52) "0 (zero)" is set at the battery cooling operation requirement DUTY value (step S53).

Also, in the step S51, in a case in which the highest temperature in the high-voltage battery 1 is lower than the battery cooling operation stop threshold (YES in the step S51), it is determined whether or not the highest temperature in the high-voltage battery 1 is lower than an IPU cooling operation stop threshold (step S54).

In the step S54, in a case in which the highest temperature in the high-voltage battery 1 is higher than the IPU cooling operation stop threshold (NO in the step S54), it is determined whether or not an occupant is in the vehicle (step S55) according to signals which are outputted from the seat sensors (such as a load sensor and an infrared sensor) which are provided to the seat as similar to the case in the step S52.

Additionally, in the step S55, in a case in which a passenger is not in the vehicle (NO in the step S55) "0 (zero)" is set for the IPU cooling operation requirement DUTY value (step S56), and "1 (one)" is set for the battery high temperature FAN stop flag (step S57) so as to stop the cooling fan 18.

On the other hand, the anti-high temperature idling process is finished so as to perform a fan mode cooperative process when either one of following conditions occurs in which, in a case in which a passenger is in the vehicle (YES in the step S52) in the step S52, or in a case in which a passenger is in the vehicle (YES in the step S55) in the step S55, furthermore in a case in which the highest temperature in the high-voltage battery 1 is lower than the IPU cooling operation stop threshold (YES in the step S54) in the step 54.

In the fan mode cooperative process, at first, it is determined whether or not the battery cooling operation requirement DUTY value is higher than the IPU cooling operation requirement DUTY value (step S58).

In the step S58, in a case in which the battery cooling operation requirement DUTY value is higher than the IPU cooling operation requirement DUTY value (YES in the step S58), the battery cooling operation requirement DUTY value is set for the control DUTY value (step S59) so as to end the fan mode cooperative process.

Also, in the step S58, in a case in which the battery cooling operation requirement DUTY value is lower than the IPU cooling operation requirement DUTY value (NO in the step S58), the IPU cooling operation requirement DUTY value is set for the control DUTY value (step S60) so as to end the fan mode cooperative process.

Next, the result of cooling fan control shown in the above-explained flow chart for the temperature controlling apparatus for battery according to the present embodiment is explained with reference to the drawings.

FIG. 8 is a view showing a waveform as a result for a controlling operation for a cooling fan for a temperature controlling apparatus for battery according to the present embodiment. In (1) in FIG. 8, a graph for transitional change temperature in the high-voltage battery 1 is shown. A continuous line shown in (2) in FIG. 8 indicates a transitional change of the control DUTY value for the cooling fan 18. In (3) in FIG. 8, a transitional change for the vehicle speed is shown. In (4) in FIG. 8, a transitional change of the IPU cooling operation requirement value is shown.

At t1 in FIG. 8, when the temperature or the heat generation in the high-voltage battery 1 is higher than the cooling operation start determination threshold, the cooling fan 18 starts cooling operation.

Here, as shown in FIG. 8, the cooling fan 18 is controlled by the control DUTY value (DUTY value which is indicated by a dot-line shown in (2) in FIG. 8) which is determined by the temperature in the high-voltage battery 1 during a period t1 to t5. The cooling fan 18 is controlled by the control DUTY value (DUTY value which is indicated rough-dot-line shown in (2) in FIG. 8) according to the tolerable noise level of the cooing fan 18 based on the vehicle speed during period t5 to t6.

Also, during period t2 to t3, the cooling fan 18 is controlled according to an LO mode forcibly according to the IPU cooling operation requirement value regardless of the control DUTY value which takes the control DUTY value according to the battery temperature and the tolerable noise level of the cooling fan 18 according to the vehicle speed into account. During period t3 to t4, the cooling fan 18 is controlled according to HI mode forcibly by the IPU cooling operation requirement value.

By doing this, in the temperature controlling apparatus for batteries according to the present embodiment, the cooling fan 18 performs the cooling operation such that the control DUTY value which is required for the temperature and the heat generation in the high-voltage battery 1 is limited by the control DUTY value according to the tolerable noise level of the cooling fan based on the vehicle speed in a case in which the temperature in the high-voltage battery 1 is lower than the predetermined limitation for highest temperature. However, in a case in which the temperature in the high-voltage battery 1, the temperature in the inverter 3 for driving motor, and the temperature in the DC/DC converter 6 are higher than the predetermined limitation for highest temperature, the cooling fan 18 is driven so as to perform the cooling operation such that the performance in the high-voltage battery 1, inverter 3 for driving motor, and the DC/DC converter 6 is not affected according to the energy storage device cooling operation requirement value and the IPU cooling operation requirement value.

As explained above, by the temperature controlling apparatus for battery according to the present embodiment, and by a vehicle apparatus provided with the temperature controlling apparatus for battery, it is possible not only to lower the temperature of each battery but also to solve the difference in the temperatures among each of a plurality of batteries by generating an air flow which flows in the battery box 52, the exterior enclosure box 55, and the heat sink case 53 by using the air which is sent from the cooling fan 18 in a case in which there is temperature difference among a plurality of batteries which are contained in the high-voltage battery 1. Also, there is an effect in that the high-voltage battery 1, the inverter 3 for driving motor, and the DC/DC converter 6 can be cooled efficiently with less cooling energy by cooling the inverter 3 for driving motor and the DC/DC converter 6 by using the cooling air which is used after cooling the high-voltage battery 1 according to a fact that the temperature in the inverter 3 for driving motor and the DC/DC converter 6 is higher than the operational temperature in the high-voltage battery 1.

Furthermore, there is an effect in that it is possible to control the cooling fan 18 in a seamless control manner instead of conventional step controlling manner so as to perform finer air control by determining the control DUTY value which is required for PWM control for the cooling fan 18 on a Z-axis in a seamless manner according to a three-dimensional map on which the highest temperature in the high-voltage battery 1 is indicated on the X-axis and the heat generation in the high-voltage battery 1 is indicated on the Y-axis.

Also, there is an effect in that it is possible to deal with the high-voltage battery 1 having high temperature so as to perform reliable temperature control for batteries by generating an air flow by using an air which is sent from the cooling fan even if there is no temperature difference among a plurality of batteries contained in the high-voltage battery 1 and the temperature in the entire high-voltage battery 1 is high.

Furthermore, there is an effect in that it is possible to set the current which is sent to the cooling fan 18 by determining the condition of the batteries contained in the high-voltage battery 1 based on both the temperature and the heat generation in the battery so as to estimate the heat generation in the battery. Thus, it is possible to detect the rise in the temperature in the battery based on the heat generation before the temperature in the battery actually rises so as to realize air control without control time lag.

Also, when the cooling fan 18 sends air to the high-voltage battery 1, it is possible to control the cooling air from the cooling fan according to the temperature in the battery such that the performance of the battery is not affected when the temperature in the high-voltage battery 1 is higher than the predetermined limitation for highest temperature and the information for the driving speed of the vehicle which is used for a reference for the air control cannot be obtained due to the disconnection of the wiring while controlling the air by maintaining the operational noise in the cooling fan 18 at a tolerable level for the occupants in the vehicle according to the driving speed (driving condition) of the vehicle. Thus, it is possible to realize a reliable temperature control for batteries.

Furthermore, in the vehicle apparatus according to the present embodiment, the current which is sent to the cooling fan is controlled under conditions that the temperature difference among the batteries takes priority over the temperature of each battery. Also, the current which is sent to the cooling fan is controlled under condition that the vehicle speed takes priority over the temperature difference among batteries. Furthermore, the vehicle apparatus controls the current which is sent to the cooling fan under conditions that the temperature of the components in the inverter device is the top priority among the above-explained conditions. By doing this, there is an effect in that it is possible to control the air which is sent from the cooling fan 18 while maintaining the air noise in tolerable level for the occupants in the vehicle and control the air from the cooling fan 18 such that the performance of the inverter 3 for driving motor for supplying current to the 3-phase AC motor for driving the vehicle is not affected.

Here, in the present embodiment, the ECU 17-1 is provided with a temperature difference calculating device according to the present invention, the control apparatus, a first setting device, a second setting apparatus, and a comparison controlling device. Also, the ECU 17-1 is provided with a limiting device, a limitation clear device, and a limitation cancel device. Furthermore, the ECU 17-1 is provided with a first current setting device, a second current setting device, a first selecting device, a third current setting device, a second selecting device, a fourth current setting device, and a control apparatus for controlling the wind apparatus (cooling fan 18) by selecting either one of the current which is selected by the second selecting device and the fourth current.

More specifically, S7 in the FIG. 3 is equivalent to the temperature difference calculating device. The steps S8 to S10 in FIG. 3 are equivalent to the control apparatus. The steps S1 to S6 in FIG. 3 are equivalent to the first setting device. The step S8 in FIG. 3 is equivalent to the second setting device. The steps S9 to S10 in FIG. 3 are equivalent to the comparison controlling apparatus.

Also, the step S35 in FIG. 5 and the steps S41 to S46 in FIG. 6 are equivalent to the control device. The steps S43 and the step S46 in FIG. 6 are equivalent to the limitation clearing device. The steps S43 and the step S46 in FIG. 6 are equivalent to the limitation clearing device. The step S34 in FIG. 5 and the steps S42 and the step S46 in FIG. 6 are equivalent to the limitation cancel device.

Furthermore, the steps S1 to S6 in FIG. 3 are equivalent to the first current setting device. The step S8 in FIG. 3 are equivalent to the second current setting device. The steps S9 to S10 in FIG. 3 are equivalent to the first selecting device. The step 41 in FIG. 6 is equivalent to the third current setting device. The step S44 in FIG. 6 is equivalent to the second selecting device. The step S32 in FIG. 5 is equivalent to the fourth current setting device.

Furthermore, the step S58 in FIG. 7 is equivalent to the control apparatus for controlling the air apparatus (cooling fan 18) by selecting either one of the current which is selected by the second selecting device and the fourth current.

What is claimed is:

1. A temperature controlling apparatus for batteries, comprising:
    a plurality of batteries connected to each other,
    a cooling fan for sending cooling air to the plurality of batteries connected to each other,
    a plurality of temperature measuring means for measuring a temperature of each of the plurality of batteries;
    a temperature difference calculating means for calculating a temperature difference among the plurality of batteries;
    a controlling means for setting and controlling electric current supplied to the cooling fan,
    an electric current measuring means for measuring current which is charged to the plurality of batteries or discharged from the plurality of batteries, said measured current being used to calculate an estimated heat generation,
    wherein said controlling means for setting and controlling electric current includes:
    a first setting means for setting a first value of the electric current supplied to the cooling fan such that if the detected temperature of the battery having the highest temperature exceeds a predetermined temperature value or if the estimated heat generation of the battery having the highest temperature exceeds a predetermined heat generation value, then the first value is set as a function of the detected temperature of the battery having the highest temperature and the estimated heat generation of the battery having the highest temperature in a three-dimensional map,
    a second setting means for setting a second value of the electric current supplied to the cooling fan according to the temperature difference between the highest temperature and the lowest temperature among the plurality of batteries; and
    a comparison controlling means for choosing a larger one of the first value and the second value, and thereby controlling the cooling fan.

2. The temperature controlling apparatus for batteries according to claim 1, wherein if the detected temperature of the battery having the highest temperature does not exceed said predetermined temperature value and the estimated heat generation of the battery having the highest temperature does not exceed said predetermined heat generation value, then the first value is set to zero.

* * * * *